(12) United States Patent
Arakawa et al.

(10) Patent No.: US 6,697,866 B1
(45) Date of Patent: Feb. 24, 2004

(54) ACCESS CONTROL METHOD FOR DATA STORED IN FIXED-BLOCK LENGTH FORMAT IN COMPUTER CONFIGURATIONS UTILIZING VARIABLE LENGTH DATA FORMAT INTERFACES

(75) Inventors: Hiroshi Arakawa, Yokohama (JP); Haruaki Watanabe, Isehara (JP); Hisaharu Takeuchi, Odawara (JP); Shigeo Homma, Odawara (JP); Kenji Yamagami, Los Gatos, CA (US); Yoshiki Kano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/571,061

(22) Filed: May 15, 2000

(30) Foreign Application Priority Data

Feb. 17, 2000 (JP) ..................... P2000-045085

(51) Int. Cl.⁷ ............................... G06F 15/16
(52) U.S. Cl. ................. 709/229; 709/227; 709/228; 711/112; 711/113; 711/114
(58) Field of Search .............................. 709/227–229; 711/112, 113, 114

(56) References Cited

U.S. PATENT DOCUMENTS

| | | | | | |
|---|---|---|---|---|---|
| 4,433,377 A | * | 2/1984 | Eustis et al. | ................... | 710/16 |
| 5,568,628 A | * | 10/1996 | Satoh et al. | ................. | 711/113 |
| 5,898,883 A | * | 4/1999 | Fujii et al. | ..................... | 712/28 |
| 6,009,108 A | * | 12/1999 | Takehara et al. | ............ | 370/538 |
| 6,098,129 A | * | 8/2000 | Fukuzawa et al. | ............. | 710/65 |
| 6,253,283 B1 | * | 6/2001 | Yamamoto | ................... | 711/114 |
| 6,421,681 B1 | * | 7/2002 | Gartner et al. | .......... | 707/103 R |
| 6,516,385 B1 | * | 2/2003 | Satoyama et al. | .......... | 711/112 |

* cited by examiner

Primary Examiner—Nabil El-Hady
(74) Attorney, Agent, or Firm—Townsend and Townsend and Crew LLP

(57) ABSTRACT

According to the invention, techniques for increasing data transfer performance during read or write of the data stored in Fixed-Block Length format in computer configurations in which a plurality of host computers are connected by a CKD format interface to a disk subsystem. Embodiments include systems, apparatuses and methods. Specific embodiments can provide increased data transfer performance in multiple format disk drive subsystems.

20 Claims, 14 Drawing Sheets

FIG.9

| Bit / Byte | 7 | 6 | 5 | 4 | 3 | 2 | 1 | |
|---|---|---|---|---|---|---|---|---|
| 1 | 12h (Operation Code)  6830 ||||||| 6810 |
| 2 | LUN ||| Reserved ||| EVPD flag | 6840 |
| 3 | 6820  Page Code ||||||| 6850 |
| 4 | Reserved ||||||| 6860 |
| 5 | Allocation Length ||||||| 6870 |
| 6 | Control Byte ||||||| 6880 |

| Bit / Byte | 7 | 6 | 5 | 4 | 3 | 2 | 1 | |
|---|---|---|---|---|---|---|---|---|
| 0 | Qualifier ||| Device Type Code |||| 6920 |
| 1 | 6910  Page Code ||||||| 6930 |
| 2 | Reserved ||||||| 6940 |
| 3 | Page Length (1) ||||||| 6950 |
| 4 | LDEV Number ||||||| 6960 |

| File Name (7210) | Host (7220) | Status (7230) |
|---|---|---|
| file 1 | Host 6100 | Read |
| file 2 | Host 6200 | Read |
| file 3 | Host 6300 | Write |
|  |  |  |
|  |  |  |
| file K-1 | Host N | Read |
| file K | Host M | Write |
| file K+1 | Host L | Read |
|  |  |  |
| file N | Host X | Read |

7240 points to the file 1 row. 7250 points to the file 3 row.

ACCESS CONTROL METHOD FOR DATA STORED IN FIXED-BLOCK LENGTH FORMAT IN COMPUTER CONFIGURATIONS UTILIZING VARIABLE LENGTH DATA FORMAT INTERFACES

CROSS-REFERENCES TO RELATED APPLICATIONS

This application claims priority from Japanese Patent Application Reference No. 2000-045085, filed Feb. 17, 2000, the entire content of which is incorporated herein by reference for all purposes.

BACKGROUND OF THE INVENTION

The present invention relates generally to a storage apparatus used for computer systems, and specifically to the storage apparatus, which can be connected to computers by a plurality of kinds of interfaces.

Conventionally, a small computer such as a personal computer (PC) or a workstation can be used for the jobs formerly handled by a large so-called mainframe computers. Accordingly, there are some computer systems comprising a mixture of mainframes, PCs and workstations using different kinds of computers and operating systems.

Disk subsystems can be used in these kinds of computer systems. For example, a disk subsystem currently in use comprises I/O interfaces of a Count Key Data format (CKD format), generally used in a mainframe, and a Fixed-Block Length format, typically used in a small computer such as a PC or workstation. In such kinds of disk subsystems, if the host computer is connected with CKD format interfaces, the disk subsystem transfers data to the host computer after converting the data into CKD format. Analogously, when the host computer is connected with Fixed-Block Length format interface, the disk subsystem transfers data to the host computer after converting the data into Fixed-Block Length format. By using such techniques, it becomes possible for the host computers with different I/O interfaces to share the data between them. What is really needed are techniques to increase data transfer performance during read or write of the data stored in Fixed-Block Length format in computer configurations in which a plurality of host computers are connected by a CKD format interface to a disk subsystem.

SUMMARY OF THE INVENTION

According to the invention, techniques for increasing data transfer performance during read or write of data stored in Fixed-Block Length format are provided. The present invention can be embodied in computer configurations in which a plurality of host computers are connected by a CKD format interface to a disk subsystem, for example. Specific embodiments include systems, apparatuses and methods. Such specific embodiments can provide increased data transfer performance in multiple format disk drive subsystems.

In a representative embodiment according to the present invention, an access method for use with a storage apparatus of a computer system is provided. The method can be embodied in a computer system comprising a computer having a variable length data format interface, and a storage apparatus which stores data on a recording media in a fixed block length format, for example. The storage apparatus is connected with the computer by the variable length data format interface. The method comprises a variety of steps, such as generating at the computer, parameters for transferring data recorded on the recording media, and generating at the computer an access command. The access command can include information indicating that data in fixed block length format is to be accessed. The access command can be in accordance with variable length data format. The method also includes transferring the access command from the computer to the storage apparatus through the variable length data format interface. Further, analyzing at the storage apparatus, the access command received from the computer; and accessing data recorded in fixed block length format based on the parameters if the access command received from the computer contains the information indicating that the access command is for the data recorded in fixed block length format can also be part of the method.

In a representative embodiment according to the present invention, a computer system is provided. The computer system comprises a first computer having a first interface for exchanging data in a variable length data format, a second interface for exchanging data in a fixed block length format, and a storage apparatus connected to the first computer by the first interface. The storage apparatus is capable of exchanging data with the first computer via the first interface according to a variable length data format. The first computer further comprises a parameter generator that generates parameters for transferring data recorded on a recording media of the storage apparatus according to a fixed block length format. The first computer can also comprise a command generator for generating a command according to a variable length data format. The command contains information indicating that data is to be accessed in fixed block length format, for example.

The storage apparatus can comprise a command analyzer for analyzing a command transferred by the first computer through the first interface. The command analyzer is operative to distinguish if a command transferred by the first computer is for data stored in accordance with fixed block length format or not. The storage apparatus can further comprise a transfer module for transferring data between the first computer and the storage apparatus according to a protocol of the first interface. The data is recorded or stored in a fixed block length format when the command transferred from the first computer is determined by the command analyzer to be a command in which the data is recorded or stored in fixed block length format.

In a yet further representative embodiment according to the present invention, a storage apparatus is provided. The storage apparatus can include a first interface in accordance with variable length data format and a second interface in accordance with fixed block length format; for example. A storage unit that stores data used by a computer connected by either of the first or second interface can also be part of the storage apparatus. Further, the storage apparatus can comprise a command analyzer for analyzing a command transferred by a first computer through the first interface. The command analyzer distinguishes if a command transferred by the first computer is directed to data stored in the storage unit in accordance with fixed block length format or not. Yet further, the storage apparatus can comprise a data transfer module for transferring data between the first computer and the storage apparatus using a protocol in accordance with the first interface. The data is read out from the storage unit or is written into the storage unit in fixed block length format, provided that when the command is transferred from the first computer, it is determined by the command analyzer to be a command to access data recorded in fixed block length format.

Numerous benefits are achieved by way of the present invention over conventional techniques. The present invention can increase data transfer performance in embodiments wherein the computers connected with CKD format interfaces read or write data stored in Fixed-Block Length format in disk subsystems. Further, in some embodiments, data can be shared between hosts at high speed. Further, specific embodiments according to the present invention can achieve effective data backup and data restoration between hosts with different interface formats.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 9 illustrates a data format diagram of a representative composition of an Inquiry command in a particular embodiment according to the present invention;

FIG. 10 illustrates a data format diagram of a representative VPD information returned to a host computer from a disk subsystem responsive to an Inquiry command in a particular embodiment according to the present invention;

FIG. 11 illustrates a table composition diagram of a representative file access list in a particular embodiment according to the present invention;

DESCRIPTION OF THE SPECIFIC EMBODIMENTS

The present invention provides systems, apparatus and methods capable of increased data transfer performance in computers connected using CKD format interfaces that read or write the data stored in Fixed-Block Length formats. Select embodiments include disk subsystems capable of sharing the data between hosts at high speed. Specific embodiments can provide effective data backup and data restoration between hosts with different interface formats.

Disk subsystems can provide data storage in a variety of formats, such as for example in Fixed-Block Length format. An example of a one disk subsystem is described in a Japanese patent unexamined publication No. 9-325905, the entire contents of which are incorporated herein by reference for all purposes. Disk subsystems can convert the Fixed-Block Length format data into CKD format data and transfer the data to a host computer, connected by a CKD format interface, when the host computer reads or writes the data. For the reasons described below, the transfer efficiency, that is, effective transfer speed can decrease in some disk subsystems. One reason is that it takes processing time to convert Fixed-Block Length format data into CKD format data. Another is that the data is divided into records and attached with additional information to identify each record in the conversion process since the data is handled as a group of records in CKD format. As a result, more data may need to be transferred.

Figure 1:
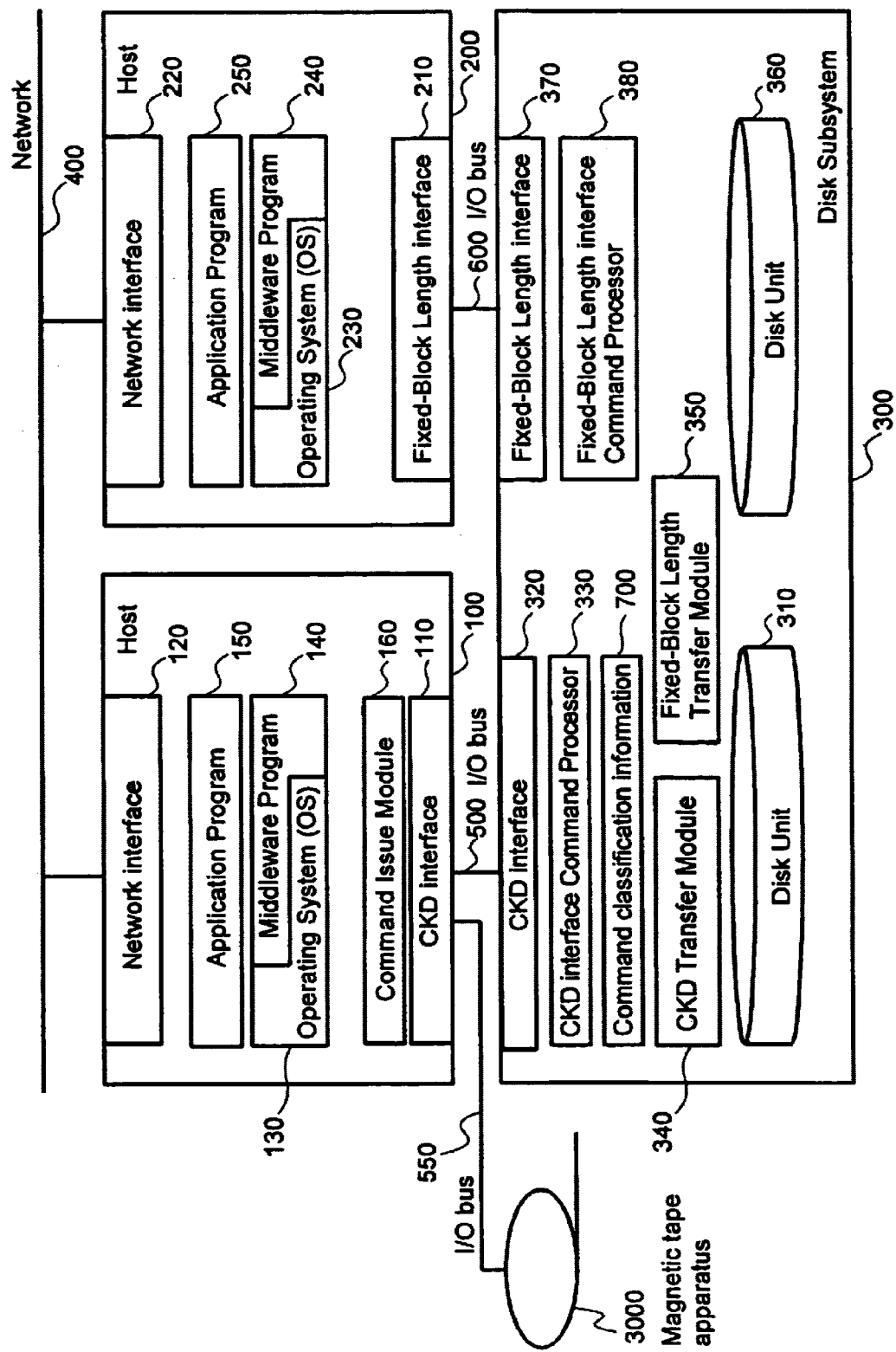
FIG. 1 illustrates a block diagram showing a representative functional composition of a computer system in a particular embodiment according to the present invention.

FIG. 1 illustrates a block diagram showing a representative functional composition of a computer system in a particular embodiment according to the present invention. The computer system of this embodiment, as shown in the figure, comprises a host computer (referred to as Host hereinafter) 100, a Host 200, a disk subsystem 300, and a magnetic tape apparatus 3000. The Host 100 and the Host 200 are connected to each other through a network 400. The Host 100 and the disk subsystem 300 are connected through an I/O bus 500 and the Host 200 and the disk subsystem 300 are connected through an I/O bus 600. The magnetic tape apparatus 3000 is connected to the Host 100 through I/O bus 550.

The Host 100 can be a so-called mainframe computer comprising an interface of variable length data format, such as an interface for an external storage apparatus like the disk subsystem 300.

Host 100 has a CKD interface 110, a network interface 120, and command issue module 160. The CKD interface 110 is connected to the disk subsystem 300 through the I/O bus 500 and to the magnetic tape apparatus 3000 through the I/O bus 550. Command issue module 160 issues various commands to the disk subsystem through the CKD interface 110. The network interface 120 is connected to network 400 and is used for communications with the Host 200 through the network 400.

The Host 100 contains operating system 130, which is a program executed by a central processing unit (CPU) not shown in the figure, middleware program 140, and application program 150. These programs are stored in a main storage apparatus not shown in the figure and various processing operations are performed when the CPU executes these programs.

The Host 200 comprises a Fixed-Block Length interface 210 and a network interface 220. The Fixed-Block Length interface 210 is connected to the disk subsystem 300 through the I/O bus 600. Then network interface 220 is connected to the network 400 and is used for the communication with the Host 100 through the network 400.

The Host 200 comprises an operating system 230, which is a program executed by a CPU not shown in the figure, a middleware program 240, and an application program 250. These programs are stored in a main storage apparatus not shown in the figure. Host 200 can be an open system computer, such as a personal computer or a workstation, for example.

The Host 100 and the Host 200 are able to transact the information related to the allocation and contents of the data stored in a disk unit 360 through the network 400 as the need arises.

Disk subsystem 300 comprises disk units 310 and 360, a CKD interface 320, a CKD interface command processor 330, a CKD transfer module 340, a Fixed-Block Length transfer module 350, a Fixed-Block Length interface 370, and a Fixed-Block Length interface command processor 380. The CKD interface 320 is connected to the CKD interface 110 in the Host 100 through the I/O bus 500. The Fixed-Block Length interface 370 is connected to the Fixed-Block Length interface 210 in the Host 200 through the I/O bus 600. A disk array system that operates multiple disk units in parallel, for example, can be used as the disk subsystem 300.

The magnetic tape apparatus 3000, which can be a storage apparatus using a magnetic tape as the recording media, is used to backup the data stored in the disk subsystem 300.

The CKD interface 110 and the CKD interface 320 are operable in accordance with Count-Key-Data format (CKD format) for accessing variable length data, which is, for instance, represented by so-called Channel interface used for a mainframe computer. The Fixed-Block Length interface 210 and the Fixed-Block Length interface 370 are operable in accordance with Fixed-Block Length format for accessing fixed length data, which can be an interface such as SCSI or Fiber channel (FC), for example.

The data in Fixed-Block Length format is stored in a fixed length area (e.g., of 512 bytes) on the recording media referred to as a block. Each block is assigned its own unique block number (LBA) and can be addressed by the block number.

The data in CKD format is stored in a variable length area on the recording media referred to as a record. In CKD format, each record can be addressed by a set of a cylinder number (CC), a head number (HH) and a record number (R). Hereinafter, the address of a record assigned by the cylinder number, the head number, and the record number is expressed as CCHHR. Moreover, the address of a group of records (i.e., track) assigned by the cylinder number and the head number is expressed as CCHH. A record comprises three parts, for example, a Count part (C part), a Key part (K part), and a Data part (D part). The C part has a fixed length and a CCHHR and each individual length of K part and D part. The K part and D part are variable length.

The Host 100 stores data into the disk unit 310 in the disk subsystem 300 in CKD format using the CKD interface 110. The Host 100 issues a normal command, defined as a CKD interface command, to the disk subsystem 300 when Host 100 performs read/write of the data stored in the disk unit 310. The disk subsystem 300 analyzes the command from the Host 100 in order to process the command.

The data stored in the disk unit 310 by the Host 100 is acceptable if it is in CKD format logically. Therefore, the data written by the Host 100 may be stored in the disk unit 310 after the data is mapped into Fixed-Block Length format by the disk subsystem 300. In disk subsystem 300, next to the disk unit 310, resides a disk drive having a Fixed-Block Length format arrangement.

The Host 200 stores Fixed-Block Length format data in the disk unit 360 in disk subsystem 300 using Fixed-Block Length interface 210. The disk unit 360 is a disk drive of Fixed-Block Length format, and the disk subsystem 300 stores the data from the Host 200 into the disk unit 360 in Fixed-Block Length format.

When the Host 200 performs read/write of the data stored in disk unit 360, it issues a command defined by Fixed-block Length interface to the disk subsystem 300. The disk subsystem 300 analyzes the command by Fixed-Block Length interface command processor 380 and processes the command. The data stored in the disk unit 360 by the Host 200 can be accessed by the Host 100.

Figure 2:
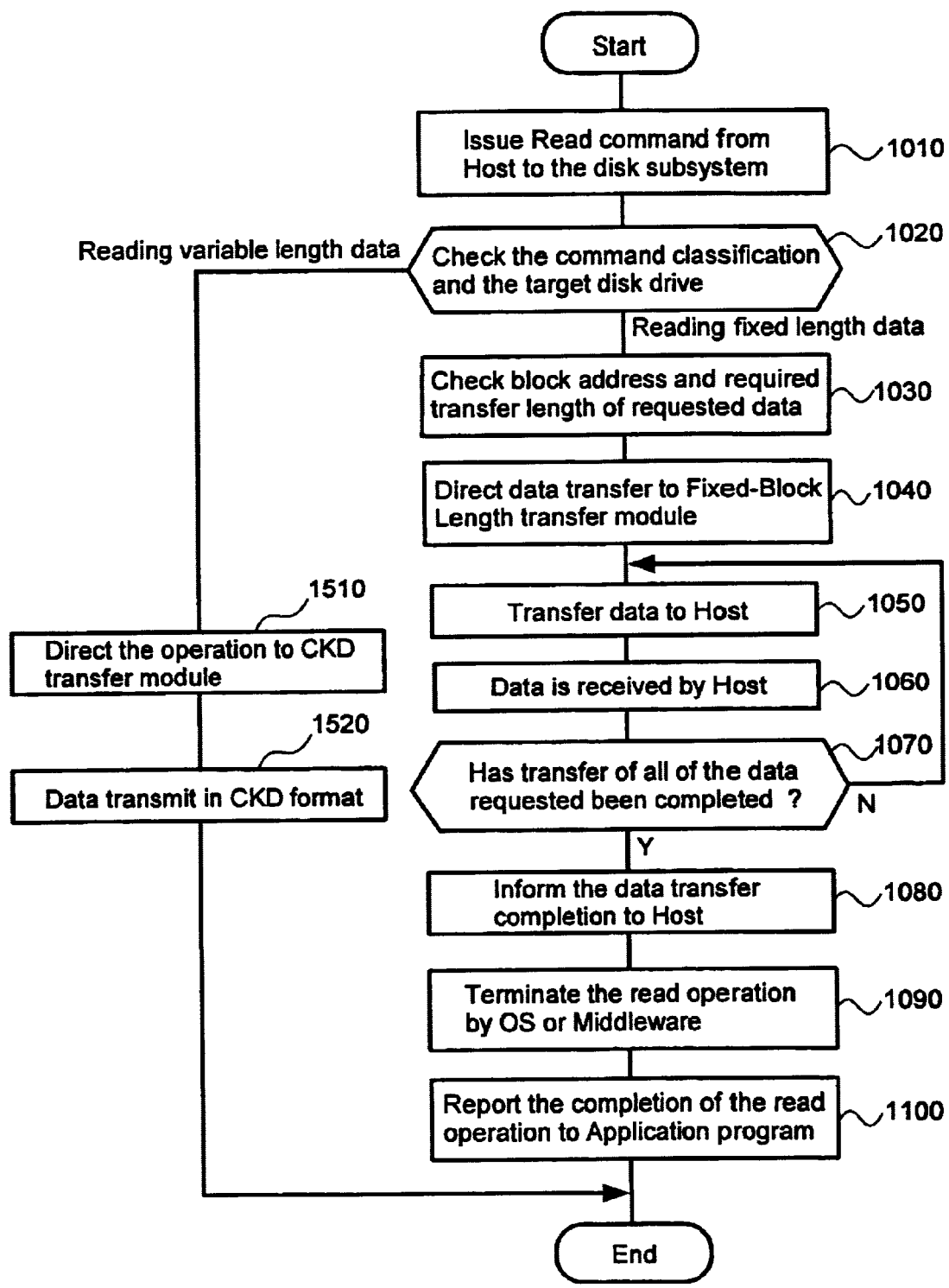
FIG. 2 illustrates a flowchart of a representative read operation to be performed in a computer system in a particular embodiment according to the present invention.

FIG. 2 illustrates a flowchart of a representative read operation to be performed in a computer system in a particular embodiment according to the present invention. FIG. 2 illustrates processing of a read operation to be performed when the Host 100 reads the data from a disk subsystem.

When itself or application program 150 requests to read the data in the disk unit 360, the operating system 130, or middleware program 140, in the Host 100 issues a read command for the data stored in Fixed-Block Length format to the disk subsystem 300. The read command can be issued by the command issue module 160 according to the request from the application program 150. The read command issued in this case is a special command to read data in accordance with Fixed-Block Length format through CKD interfaces 110 and 320.

This read command is organized by a byte train which is modified partially from a byte train of a normal read command, which is in accordance with CKD format. A code indicating the command is a read command, a predetermined code indicating the data to be in Fixed-Block Length format, a block address of the data to be read, and a requested transfer size (i.e., number of blocks) are set at predetermined positions of the byte train (Step 1010).

The disk subsystem 300 processes the received command with the CKD interface command processor 330. The CKD interface command processor 330 has command classification information 700 regarding the format and the classification of a command, which it uses to analyze the received command, and to distinguish the object disk unit and the classification of the command (Step 1020).

The CKD interface command processor 330 obtains the block address and the required transfer size (number of blocks) of the object data to be read (Step 1030). Then, CKD interface command processor 330 directs the transfer of the data to the Fixed-Block Length transfer module 350 (Step 1040) if the command, as the result of the analysis, is recognized as a request to read the Fixed-Block Length format data in disk unit 360. The Fixed-Block Length transfer module 350, having been directed to transfer data, transfers the data of the disk unit 360 block by block to the Host 100 through CKD interface 110 (Step 1050).

Operating system 130, or middleware program 140, in the Host 100 stores the data transfers block by block into a buffer prepared in the memory of the Host 100 (Step 1060).

The Fixed-Block Length transfer module 350 checks if all of the data requested has been transferred to the Host 100 (Step 1070). The Fixed-Block Length transfer module 350 continues data transfer by returning to the operation of Step 1050 if all of the data has not been transferred completely. On the contrary, if all of the data has been transferred completely, the Fixed-Block Length transfer module 350 reports the completion of data transfer to the Host 100 (Step 1080).

Operating system 130, or middleware program 140, terminates the read operation by receiving the report of the completion of the data transfer (Step 1090). In the case where the read operation is performed responsive to a request by application program 150, then the operating system 130, or middleware program 140, informs the application program 150 of the completion of the read operation (Step 1100).

Operating system 130, middleware program 140, or application program 150 can store the readout data as a backup data, for example, for the data in the disk unit 360. In addition, these programs can utilize the data that is used by operating system 230, middleware program 240, or application program 250 in the Host 200 by reading the data out of the disk unit 360 according to the techniques described above.

The CKD interface command processor 330 directs the operation to CKD transfer module 340, provided that, at step 1020, it was determined that the received command is directed to the disk unit 310 and was recognized as a normal command in accordance with CKD format (Step 1510). Then, the CKD transfer module 340 performs data transfer with the Host 100 in accordance with CKD format responsive to the command (Step 1520).

According to the process described above, the Host 100 can read out the data stored in Fixed-Block Length format in the disk unit 360 without necessitating additional overhead of the conversion to CKD format in the disk subsystem 300 and without increasing the data transfer size caused by converting the data.

Figure 3:
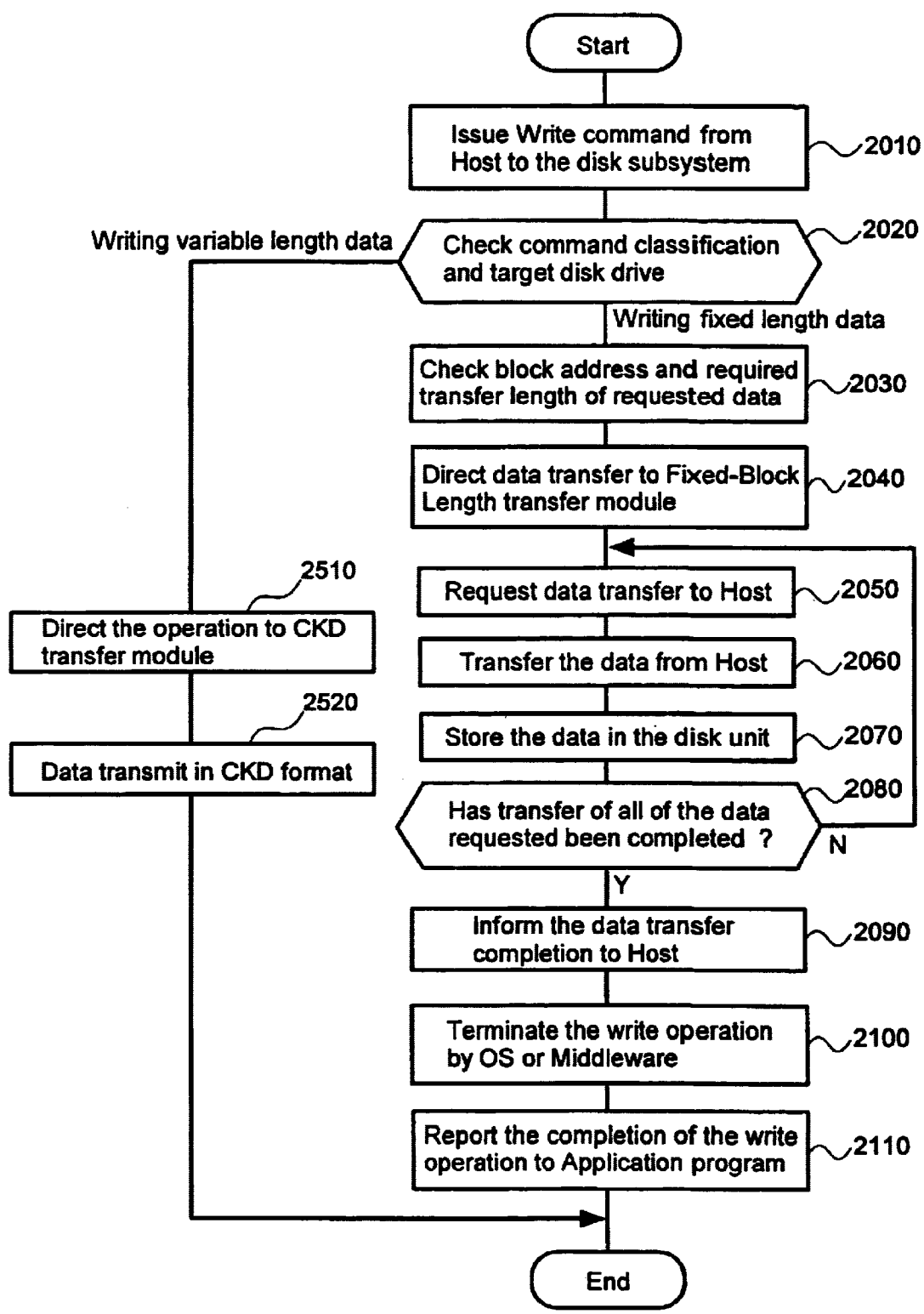
FIG. 3 illustrates a flowchart of a representative write operation to be performed in a computer system in a particular embodiment according to the present invention.

FIG. 3 illustrates a flowchart of a representative write operation to be performed in a computer system in a particular embodiment according to the present invention. FIG. 3 illustrates a writing process performed when the Host 100 writes data into the disk unit 360, for example.

When operating system 130, middleware program 140, or application program 150 requests to write data into the disk unit 360, operating system 130, or middleware program 140, in the Host 100 issues a write command to disk subsystem 300 by using the command issue module 160 according to the request. At that time, the data to be written into the disk unit 360 is stored in the buffer, prepared in the memory of the Host 100 in Fixed-Block Length format by the program which issued the write request. The write command issued in this case is a special command to write data in accordance with Fixed-Block Length format, similar to that used for the read command. The byte train of the write command includes a code to indicate the command is a write command, a predetermined code indicating the object data to be in Fixed-Block Length format, and the block address and the transfer size (number of blocks) of the object data at predetermined positions of the byte train (Step 2010).

The disk subsystem 300 processes the received write command with CKD interface command processor 330. The CKD interface command processor 330 analyzes the command referring to command classification information 700 and distinguishes the target disk unit and the classification of the command similar to the processing of a read command (Step 2020).

CKD interface command processor 330 obtains the block address and the transfer size (number of blocks) of the object data to be written and directs the transfer of the data to the Fixed-Block Length transfer module 350 (Step 2030) if the write command is recognized as an instruction to write the Fixed-Block Length format data.

The Fixed-Block Length transfer module 350 requests the Host 100 to transfer the data through the CKD interface 320 responsive to the write data transfer instruction (Step 2050). Operating system 130, or middleware program 140, in the Host 100, which received the request from the Fixed-Block Length transfer module 350, transfers the write data byte by byte to disk subsystem 300 (Step 2060). Then, the Fixed-Block Length transfer module 350 receives the data transferred from the Host 100 and stores the data in the disk unit 360 (Step 2070).

The Fixed-Block Length transfer module 350 checks if all of the data defined in the write command has been received (Step 2080). If all of the data has not been received completely, the Fixed-Block Length transfer module 350 continues the transfer operation by, returning to the operation of Step 2050. The Fixed-Block Length transfer module 350 reports the completion of the data transfer to the Host 100 if all of the data defined in the write command has been received (Step 2090).

Operating system 130, or middleware program 140, terminates the write operation by receiving a transfer completion report from the disk subsystem 300 (Step 2100). If the write operation is initiated by a request from application program 150, then operating system 130, or middleware program 140, informs the application program 150 of the completion of the write operation (Step 2110).

According to the write operation described above, operating system 130, middleware program 140, or application program 150 can store the data used by operating system 230, middleware program 240 or application program 250 in the Host 200 into the disk unit 360.

The CKD interface command processor 330 directs the operation of the CKD transfer module 340, provided that, at step 2020, it was determined that the received command is directed to the disk unit 310 and was recognized as a normal command in accordance with a CKD command format (Step 2510). The CKD transfer module 340 performs data transfer with the Host 100 in accordance with CKD format responsive to the command (Step 2520).

According to the process described above, the Host 100 can write the data into the disk unit 360 in Fixed-Block Length format without incurring the overhead of converting to CKD format in the disk subsystem 300, nor an increase of transfer size caused by such a conversion.

Using the read operation and the write operation described above, backup operations for data stored in the disk unit 360 by the Host 200 onto the magnetic tape apparatus 3000 is explained below. The backup programs running on the Host 100 and the Host 200 perform the backup operation will be described herein in greater detail. The backup program is provided as one of application programs 150 and 250 in the Host 100 and the Host 200, respectively.

Figure 4:
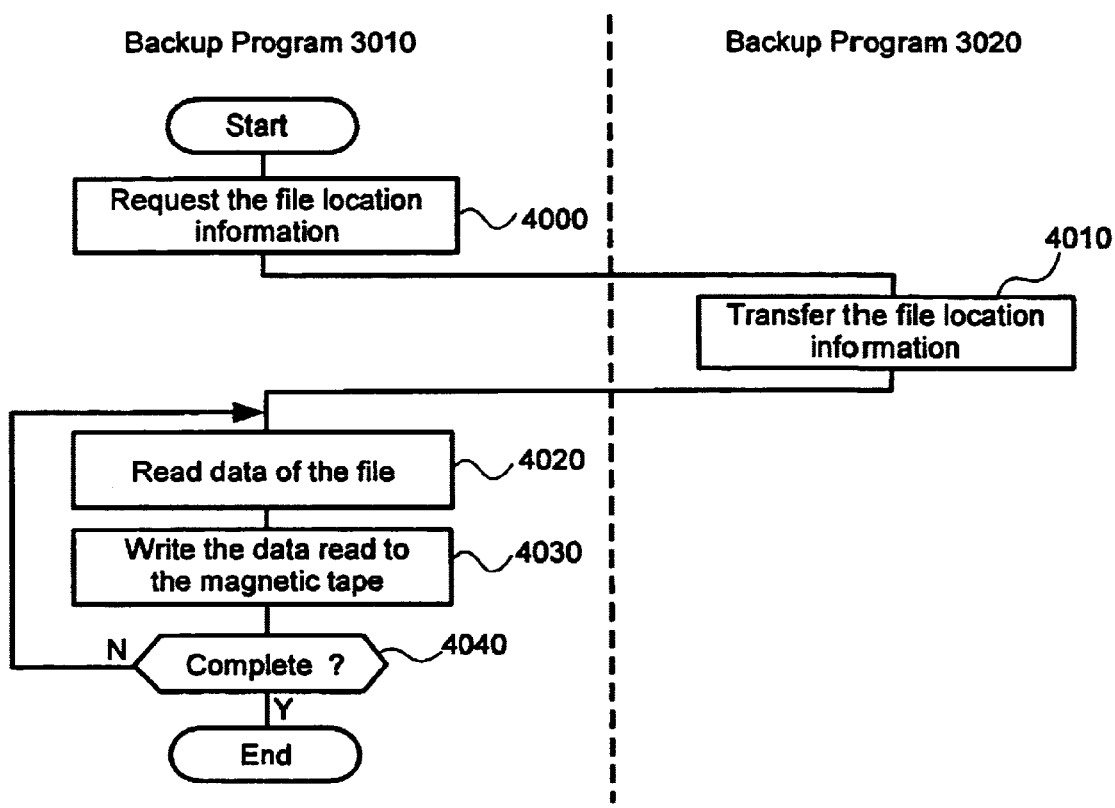
FIG. 4 illustrates a flowchart of a representative backup operation to be performed in a computer system in a particular embodiment according to the present invention.

FIG. 4 illustrates a flowchart of a representative backup operation to be performed in a computer system in a particular embodiment according to the present invention. The backup program running on the Host 100 starts backup operation upon the instruction from a predetermined schedule or from a user. The backup program in the Host 100 first requests the location information of a file for backup from the backup program running on the Host 200 through the network 400 (Step 4000).

The backup program in the Host 200 obtains the location information in the disk unit 360 of the file for the backup from its own managing information or from the information managed by middleware program 240 or by operating system 230. Location information can comprise LBA and number of blocks, for example. The backup program in the Host 200 then transfers the file location information to the backup program in the Host 100 (Step 4010).

The file location information includes the information relating to LBA (starting LBA) which indicates the starting address in the disk unit 360 storing the file, and number of blocks. If the file is allocated in a plurality of areas in the disk unit 360, a starting address and a number of blocks for each of the areas are included.

The backup program in the Host 100 reads out the file to be backed-up based on the file location information transferred from the backup program in the Host 200 in accordance with the read operation procedure described above (Step 4020). The backup program records the data read from the disk unit 360 onto the magnetic tape apparatus 3000 (Step 4030).

Then, the backup program in the Host 100 performs Step 4020 and Step 4030 for the data of all the blocks indicated by the file location information received from the Host 200, and checks whether the backup process has been completed. The backup program terminates the backup process when the processing for all of the blocks has been completed. If there are any unprocessed blocks remaining, the backup program returns to Step 4020 to continue the backup process (Step 4040).

A restore operation of the data backed-up according to the process described above can be performed in a manor similar to the backup process. First, the restore program in the Host 100 obtains file location information from the restore program running on the Host 200. Next, the restore program in the Host 100 reads out the data from a magnetic tape which stores the file to be restored, and writes the data read from the magnetic tape into the disk unit 360 based on the file location information received from the Host 200.

In the explanation described above, the backup program in the Host 100 initiates the backup operation. However, the backup program in the Host 200 may initiate backup processing as well. The backup process in this embodiment is performed as follows.

The backup program in the Host 200 obtains the location information of the object file to be backed-up based upon a predetermined schedule or an instruction of a user. The backup program in the Host 200 makes a request to start backup operation to the backup program in the Host 100. The file location information is sent to the Host 100 with the request. The backup program 3010 in the Host 100 performs Step 4020, Step 4030 and Step 4040 described above upon the request from the backup program in the Host 200.

According to the processing described above, a host computer with CKD format interface can access the data stored in Fixed-Block Length format in a disk subsystem without conversion of the data format in the disk subsystem. Accordingly, specific embodiments according to the present invention can provide high-performance data transfer and data sharing between computers with different type of I/O interfaces. Further, in a specific embodiment, a computer with an I/O interface for variable length format can perform backup operations of the data from a disk subsystem stored in Fixed-Block Length format.

Figure 5:
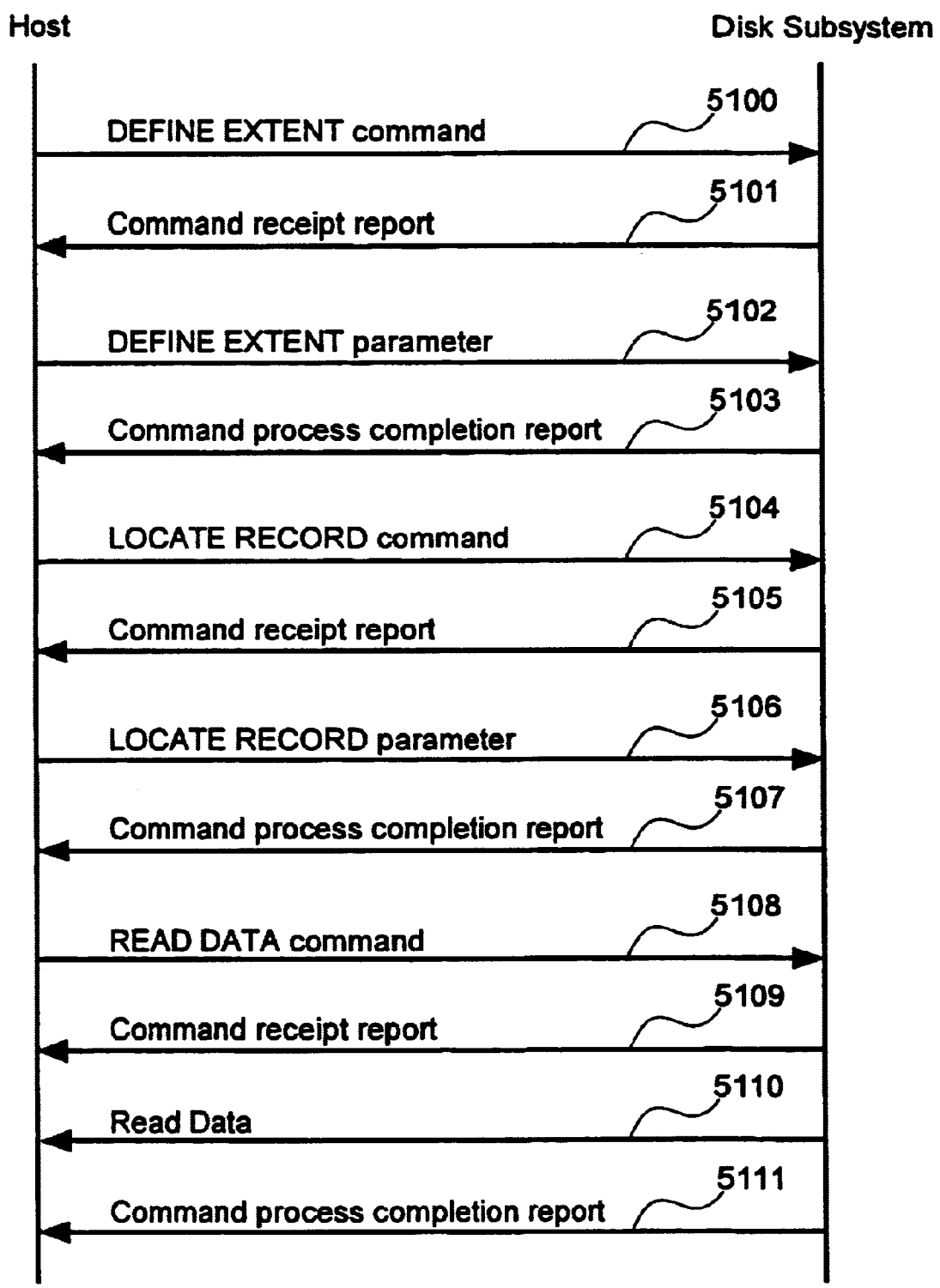
FIG. 5 illustrates a sequence chart of a representative access protocol for accessing data stored in a disk unit in Fixed-Block Length format in a second particular embodiment according to the present invention.

FIG. 5 illustrates a sequence chart of a representative access protocol for accessing data stored in a disk unit in Fixed-Block Length format in another particular embodiment according to the present invention. FIG. 5 illustrates a sequence chart to show access protocol to access the data stored in the disk unit 360 by the Host 100 in Fixed-Block Length format. The computer system in this embodiment comprises substantially similar configuration to the computer system described herein above with reference to FIG. 1. Therefore, specific embodiments will be described herein with reference to the system configuration as illustrated in FIG. 1.

In this embodiment, the Host 100 issues a DEFINE EXTENT command 5100 which defines the extent of a seek operation and a write operation to the disk subsystem 300 for accessing the disk unit 360. The disk subsystem 300 sends a command receipt report 5101 to the Host 100 upon receipt of DEFINE EXTENT command 5100 in order to inform Host 100 of the receipt of the command.

Then, the Host 100 issues a DEFINE EXTENT parameter 5102 which is a command parameter of DEFINE EXTENT command 5100 to the disk subsystem 300. The disk subsystem 300 performs processing according to the parameter and informs the Host 5015 of completion of the command processing by a command process completion report 5103 after the receipt of DEFINE EXTENT parameter 5102. DEFINE EXTENT parameter 5102 can be, for example, a parameter of conventional CKD format, as known to those of ordinary skill in the art.

The Host 100 issues LOCATE RECORD command 5104 indicating the data location to be processed to the disk subsystem 300 when the command process completion report 5103 is reported from the disk subsystem 300. Upon receipt of LOCATE RECORD command 5104, the disk subsystem 300 sends command receipt report 5105 to the Host 100 in order to report the receipt of the command.

Next, the Host 100 issues LOCATE RECORD parameter 5106 which is a command parameter of LOCATE RECORD command 5104, which will be described below, to the disk subsystem 300. The disk subsystem 300 performs the processing in accordance with LOCATE RECORD parameter 5106 and reports command process completion report 5107 to the Host 100.

Then the Host 100 issues READ DATA command 5108 to the disk subsystem 300. Upon receipt of READ DATA command 5108, the disk subsystem 300 sends command receipt report 5109, transfers the data defined by LOCATE RECORD command 5104 and LOCATE RECORD parameter 5106 to the Host 100, and then reports command process completion report 5111. After that, there may be one or more READ DATA command(s) following. In such case, the disk subsystem 300 transfers the following data in order to the Host 100.

In case of writing data into the disk unit 360, a WRITE DATA command, instead of READ DATA command, is issued to the disk subsystem 300 by the Host 100. In this case, the disk subsystem 300 writes the data transferred from the Host 100 to the location defined by LOCATE RECORD command 5104.

Figure 6:
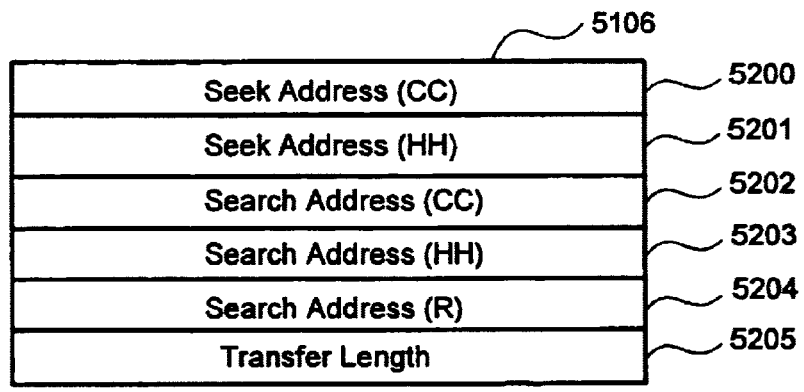
FIG. 6 illustrates a format diagram of a parameter in a representative LOCATE RECORD command in a particular embodiment according to the present invention.

FIG. 6 illustrates a format diagram of a representative LOCATE RECORD parameter in a particular embodiment according to the present invention. FIG. 6 illustrates a format diagram of a LOCATE RECORD parameter 5106. The LOCATE RECORD parameter 5106 comprises a seek address (CC) 5200, a seek address (HH) 5201, a search address (CC) 5202, a search address (HH) 5203, a search address (R) 5204, and a transfer length 5205.

When accessing a record in the normal CKD format, the values specifying the record are stored in seek address (CC) 5200, seek address (HH) 5201, search address (CC) 5202, search address (HH) 5203 and search address (R) 5204. The value for data transfer length is stored in transfer length 5205.

In specific embodiments, the information specifying the access block is stored in seek address (CC) 5200, seek address (HH) 5201, and search address (R) 5204 in order to access data in Fixed-Block Length format. Using an LBA for the data to be transferred, the values obtained by the following formulas are applied to seek address (CC) 5200, seek address (HH) 5201, and search address (R) 5204.

| | |
|---|---|
| CC = | INT (LBA/(96*15)) + 1 |
| HH = | INT (MOD(LBA, (96*15))/96 |
| R = | MOD (LBA, 96) + 1 |

Where, "INT(A)" is a maximum integer not more than A, and "MOD(A, B) is a function to define a remainder of dividing A by B.

Search address (CC) 5202 and search address (HH) 5203 store predetermined values, which indicate that, a series of the commands including the present command is a special command group to access the data in Fixed-Block Length format. Transfer length 5205 stores number of blocks to be accessed. Transfer length 5205 can be specified in terms of number of bytes or number of blocks of the data to be transferred.

Figure 7:
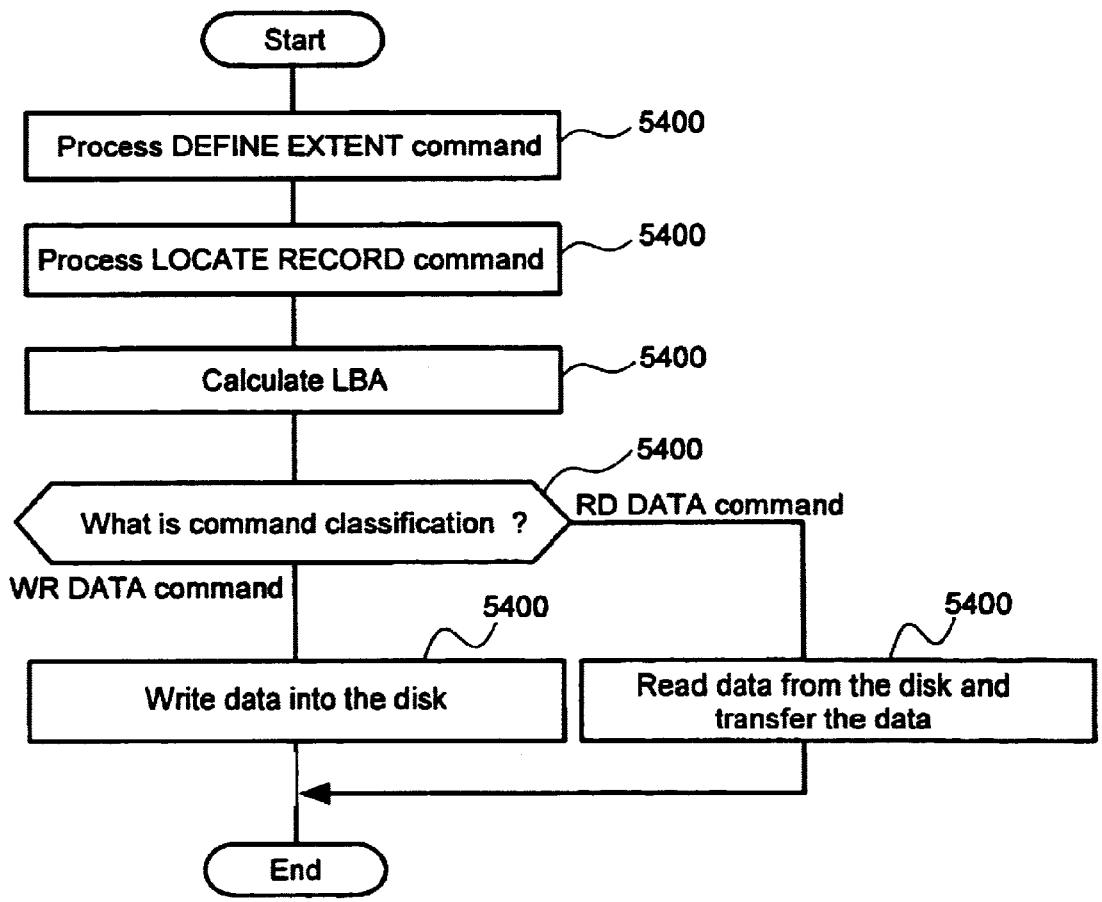
FIG. 7 illustrates a flowchart of a representative process performed by CKD interface command processor of a disk subsystem responsive to a series of commands from a host computer in a particular embodiment according to the present invention.

FIG. 7 illustrates a flowchart of a representative process performed by CKD interface command processor of a disk subsystem in a particular embodiment according to the present invention. FIG. 7 illustrates a flowchart of the processing performed by CKD interface command processor 330 of the disk subsystem 300 responsive to a series of commands from the Host 100 as shown in FIG. 5.

Upon receipt of DEFINE EXTENT command 5100, the CKD interface command processor 330 sends command receipt report 5101 to the Host 100. The CKD interface command processor 330 receives the following DEFINE EXTENT parameter 5102 and informs the Host 100 by a command process completion report 5103 (Step 5400).

Next, the CKD interface command processor 330 sends command receipt report 5105 to the Host 100 after receiving LOCATE RECORD command 5104. Thereafter, it receives LOCATE RECORD parameter 5106 transferred from the Host 100 and informs the Host 100 by a command process completion report 5107 (Step 5401).

Then, search address (CC) 5202 and search address (HH) 5203 contained in LOCATE RECORD parameter 5106 received in step 5401 are checked for indications of the predetermined values used for accessing Fixed-Block Length data. If it indicates the predetermined values used for accessing Fixed-Block Length data as search address (CC) 5202 and search address (HH) 5203, then LBA is calculated from the values indicated as seek address (CC) 5200, seek address (HH) 5201 and search address (R) 5204 using the following relationship (Step 5402).

$$LBA=15*96*(CC-1)+96*HH+(R31\ 1)$$

Then, the CKD interface command processor 330 determines the classification of the command transferred following LOCATE RECORD parameter 5106 (Step 5403).

In a case where the received command is WRITE DATA command, the CKD interface command processor 330 receives the write data from the Host 100 and stores the data to the block corresponding to the LBA obtained by Step 5402 and transfer length 5205 (Step 5404).

If the command received from the Host 100 in Step 5403 is READ DATA command 5108, then the CKD interface command processor 330 reads the data out of the block to be read from the disk unit 360 based upon the LBA obtained in Step 5402 and transfer length 5205. Thereupon, the CKD interface command processor 330 transfers the data to the Host 100 (Step 5405).

If a plurality of commands, such as READ DATA command 5108 or WRITE DATA command, are issued, then the CKD interface command processor 330 performs Step 5404 or Step 5405 a plurality of times.

According to this embodiment, it is possible to access the data in a disk unit stored in Fixed-Block Length format by the I/O format in accordance with CKD format. Particularly, the data stored in one or more blocks can be accessed by a single READ DATA command or a single WRITE DATA command.

Figure 8:
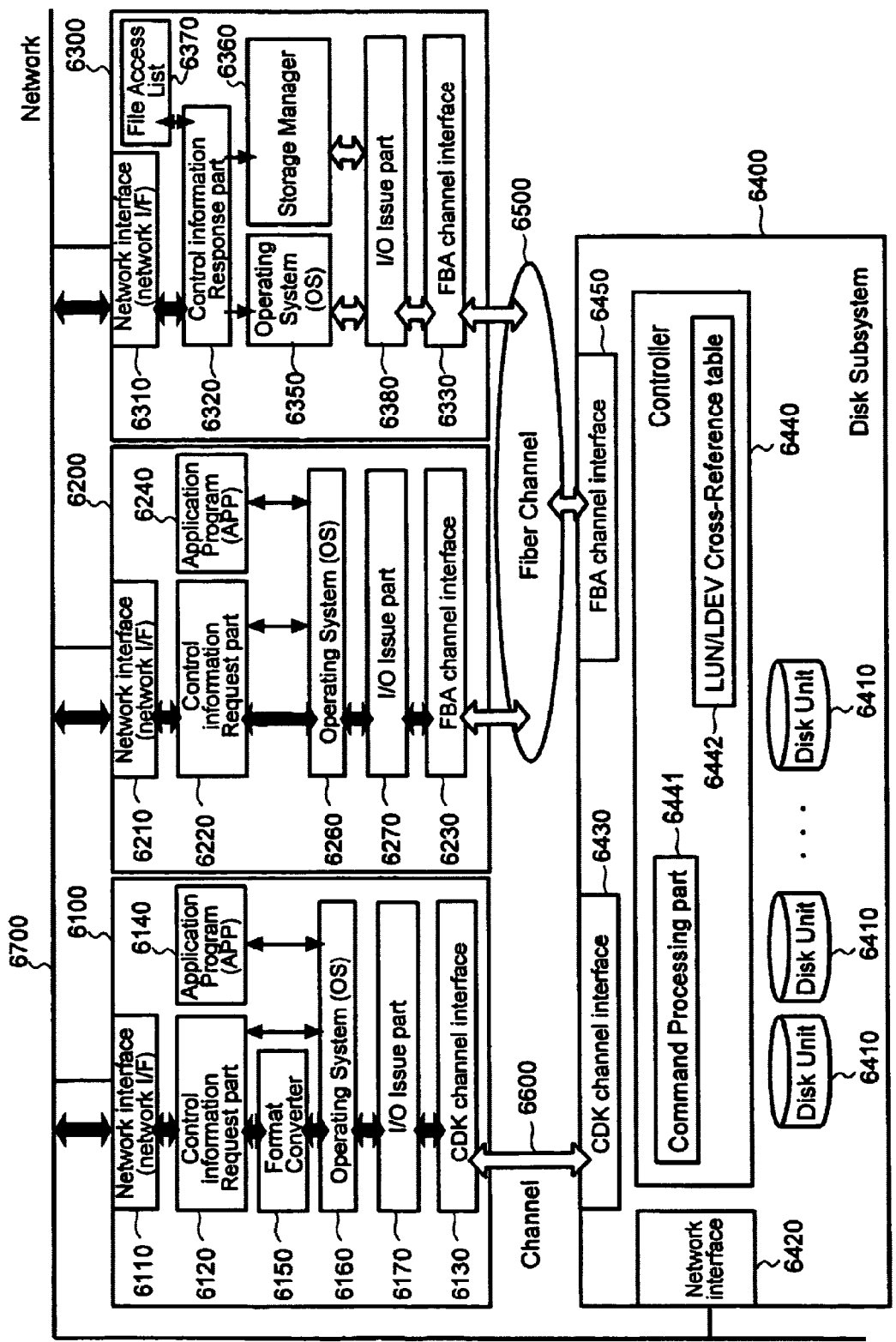
FIG. 8 illustrates a block diagram of a representative functional composition of a computer system in a third particular embodiment according to the present invention.

FIG. 8 illustrates a block diagram of a representative functional composition of a computer system in a yet further particular embodiment according to the present invention. The computer system in this embodiment comprises three Hosts 6100, 6200, and 6300, and a disk subsystem 6400 as shown in FIG. 8. The Host 6100 is connected to the disk subsystem 6400 via a channel interface generally used in mainframes, and the Host 6200 or the Host 6300 is connected to the disk subsystem 6400 via Fixed-Block Length format interface such as Fiber channel.

The disk subsystem 6400 is a storage apparatus shared by the Host 6100, the Host 6200 and the Host 6300. The disk subsystem 6400 comprises a plurality of disk units 6410, a network interface 6420, a CKD channel interface 6430, a controller 6440, and a FBA channel interface 6450. The disk unit 6410 is a storage unit used to store data in Fixed-Block Length format, which has been prepared with a plurality of blocks for use as a data storage area.

A command processing part 6441 and an LUN/LDEV cross-reference table 6442 are implemented in the controller 6440 which controls the access from each host to the disk unit 6410. The command processing part 6441 replaces a CKD format command with an FBA format command and performs read operation, write operation, and the like, to/from the disk unit 6410.

In this embodiment, the disk subsystem 6400 appears to be one of a plurality of logical device(s) to the host by collecting a plurality of disk units 6410. These logical devices can be accessed by either of CKD channel interface 6430 and FBA channel interface 6450. Therefore, in a specific embodiment, the device name used by the Host 6100 and the device name used by the Host 6200 and the Host 6300 must coincide with each other.

The LUN/LDEV cross-reference table 6442 is a table for holding the relationship between a logical device number (LDEV number), indicating the composition of disk units inside the disk subsystem 6400, and a logical unit number (LUN) used for the Host 6200 and Host 6300 to manage logical devices.

The Host 6200 and Host 6300 issue an Inquiry command in accordance with SCSI protocol to the disk subsystem 6400, so that they can obtain the information about the disk subsystem 6400. In this embodiment, by extending the return value for Inquiry command, LDEV number inside the disk subsystem 6400 corresponding to a certain LUN can be obtained in addition to other information such as device manufacturer information, manufacturing serial number, and type of device.

FIG. 9 illustrates a data format diagram of a representative composition of an Inquiry command issued by a host computer in a particular embodiment according to the present invention. The Inquiry command shown in FIG. 9 comprises an operation code 6810, an LUN 6820, an EVPD flag 6840, a page code 6850, an allocation length 6870, and a control byte 6880. An EVPD flag 6840, which can be bit-wise information, is set when a host requires a VPD information 6900, which includes vender unique information.

FIG. 10 illustrates a data format diagram of a representative VPD information returned to a host computer from a disk subsystem responsive to an Inquiry command in a particular embodiment according to the present invention. FIG. 10 illustrates a data format diagram of VPD information 6900 returned to a host from the disk subsystem 6400 in response to an Inquiry command.

VPD information 6900 comprises a qualifier 6910, a device code type 6920, a page code 6930, a page length 6950, and an LDEV number 6960. The controller 6440 obtains the LDEV number by referring to LUN/LDEV cross-reference table 6442, corresponding to LUN 6820 within Inquiry command 6800 received from a host, and then sets the LDEV number as LDEV number 6960. The host obtains LDEV number 6960 from LDEV parameter within returned VPD information 6900.

The Host 6100 comprises a network interface (network I/F) 6110, a control information request part 6120, a CKD channel interface 6130, an application program (APP) 6140, a format converter 6150, an operating system (OS) 6160, and an I/O issue part 6170.

The Control information request part 6120 can make a request to the Host 6300 for the control information necessary for read operation to and write operation from a file in the disk subsystem 6400 shared by the Host 6100 and the Host 6200. The control information comprises file management information, which includes information such as the volume information of the disk subsystem 6400 in which the file exists and the file storing location (LBA) and size. The control information request part 6120 operates, in conjunction with the format converter 6150, in the process of read/write for the file stored in the disk subsystem 6400.

The CKD channel interface 6130 is connected with the CKD channel interface 6430 and performs I/O operation of the Host 6100. The application program 6140 is software to read/write the file shared within the disk subsystem 6400.

The format converter 6150 has a function to convert the format in order that the Host 6100 can utilize LBA within the control information given by the Host 6300. In a specific embodiment, format converter 6150 converts LBA within the control information to CKD format, which can be handled by the Host 6100.

Host 6200 comprises network I/F 6210, a control information request part 6220, an FBA channel interface 6230, an application program 6240, an OS 6260, and an I/O issue part 6270. The control information request part 6220 has an analogous function to the control information request part 6120 of the Host 6100. However, the control information request part 6220 is different from the control information request part 6120 of the Host 6100 in terms of its interoperable function to work format converter 6150.

The Host 6300 manages a file in the disk subsystem 6400 used by the Host 6100 and the Host 6200, and controls read/write operation for the file in the disk subsystem 6400 shared by the Host 6100 and the Host 6200. The Host 6300 comprises a network I/F 6310, a control information response part 6320, a channel interface 6330, an OS 6350, a storage manager 6360, a file access list 6370, and an I/O issue part 6380.

Control information response part 6320 returns a control information responsive to a request for read/write operation from the control information request part 6120 or 6220 of the Host 6100 or Host 6200. The control information includes such information as file management information regarding the file held by OS 6350 and logical volume number, managed by the storage manager 6360, within the disk subsystem 6400. There is such information in the file management information as file name, LBA, file size and file access permission regarding the file composition.

The storage manager 6360 manages the correspondence between LUN used by the Hosts 6200, 6300 and LDEV number in the disk subsystem 6400.

FIG. 11 illustrates a composition diagram of a representative file access list in a particular embodiment according to the present invention. FIG. 11 illustrates a table composition diagram to show an example of the file access list 6370. Items such as a file name 7210, a Host 7220 and a status 7230 can be included in each row of the file access list 6370. File name 7210 is the name of a file on which read/write operation is to be performed by a host. Host 7220 is a name used to identify the host that is performing read/write of a file. Status 7230 indicates the status of a file access from a host. In status 7230, "Read" is set during read operation and "Write" is set during write operation.

Information can be appended to the file access list 6370 at read/write operation by the Host 6100 or the Host 6200. According to this embodiment, the file shared by the Host 6100 and the Host 6200 is accessed exclusively by using the file access list 6370. For instance, when status 7230 is set as "Write", a new request to write to or read from the file is not permitted. Such a request is forced to wait until the current entry is eliminated or refused.

On the other hand, a new request issued for read can be performed even if status 7230 for a file is set as "Read". In this case, a new entry corresponding to the following read request is set to the file access list 6370. If the following request is a write request, the write request is forced to wait or refused as was described above.

Figure 12:
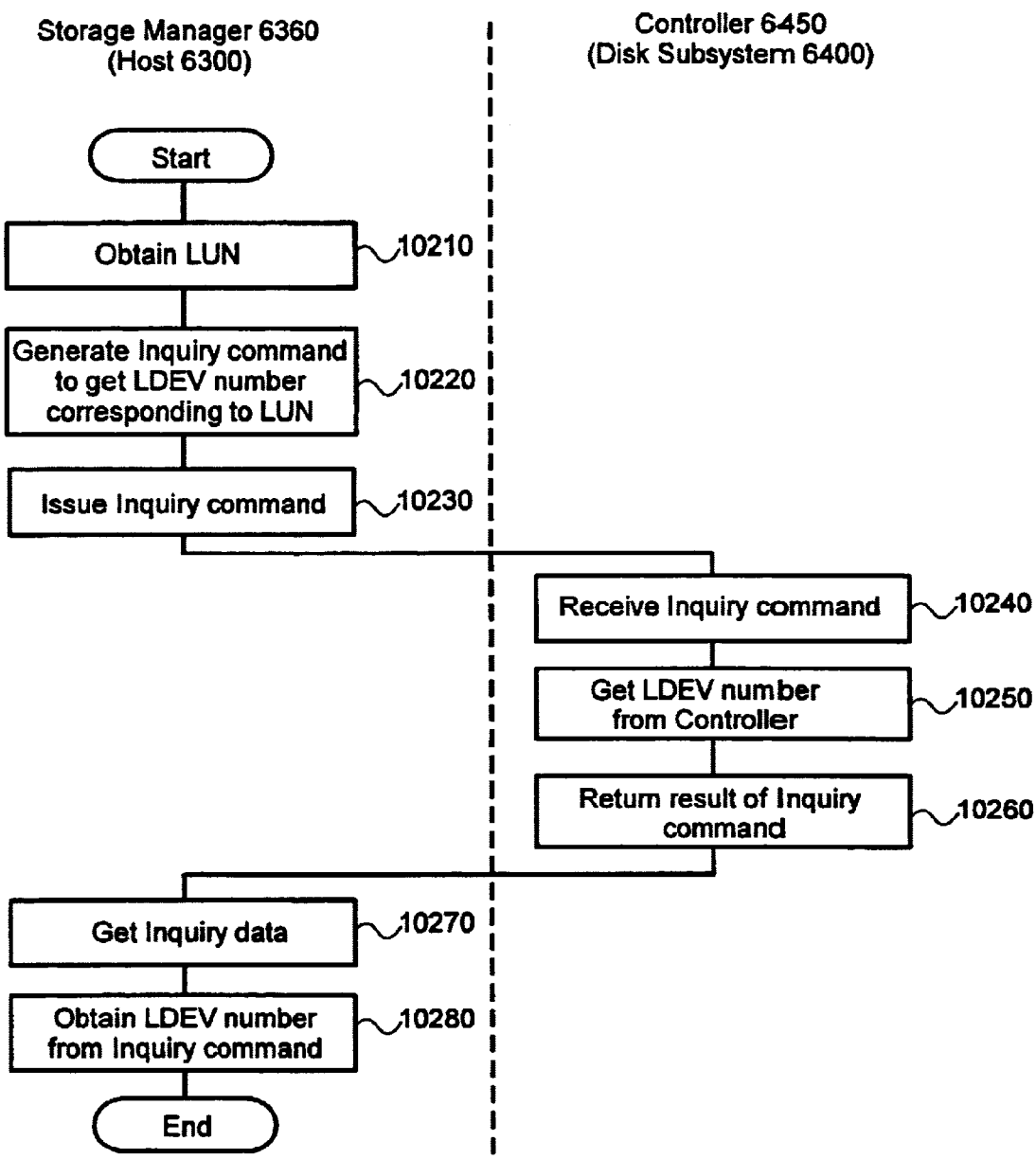
FIG. 12 illustrates a flowchart of representative processing used by a storage manager to obtain the corresponding relation between LUN and LDEV number in a particular embodiment according to the present invention.

FIG. 12 illustrates a flowchart of representative processing used by a storage manager to obtain the corresponding relation between LUN and LDEV number in a particular embodiment according to the present invention.

First, the storage manager 6360 obtains an LUN of the logical device in which the file is located from OS 6350 when it intends to obtain the corresponding relation between an LUN and an LDEV number (Step 10210). Next, it generates Inquiry command 6800 to get LDEV number in the disk subsystem 6400 corresponding to the obtained LUN (Step 10220), and sends the command to the controller 6440 in the disk subsystem 6400 (Step 10230).

Upon receipt of Inquiry command 6800 from the Host 6300 (Step 10240), the controller 6440 in the disk subsystem 6400 obtains LDEV number corresponding to the LUN included in Inquiry command by referring to LUN/LDEV cross-reference table (Step 10250). The controller 6440 creates VPD information 6900 which includes LDEV number obtained, and returns the VPD information to the Host 6300 (Step 10260).

The storage manager 6360 receives the VPD information 6900 returned from the disk subsystem 6400 (Step 10270), and obtains LDEV number from the VPD information 6900. The storage manager 6360 stores the obtained LDEV number making the corresponding relation to LUN.

Figure 13:
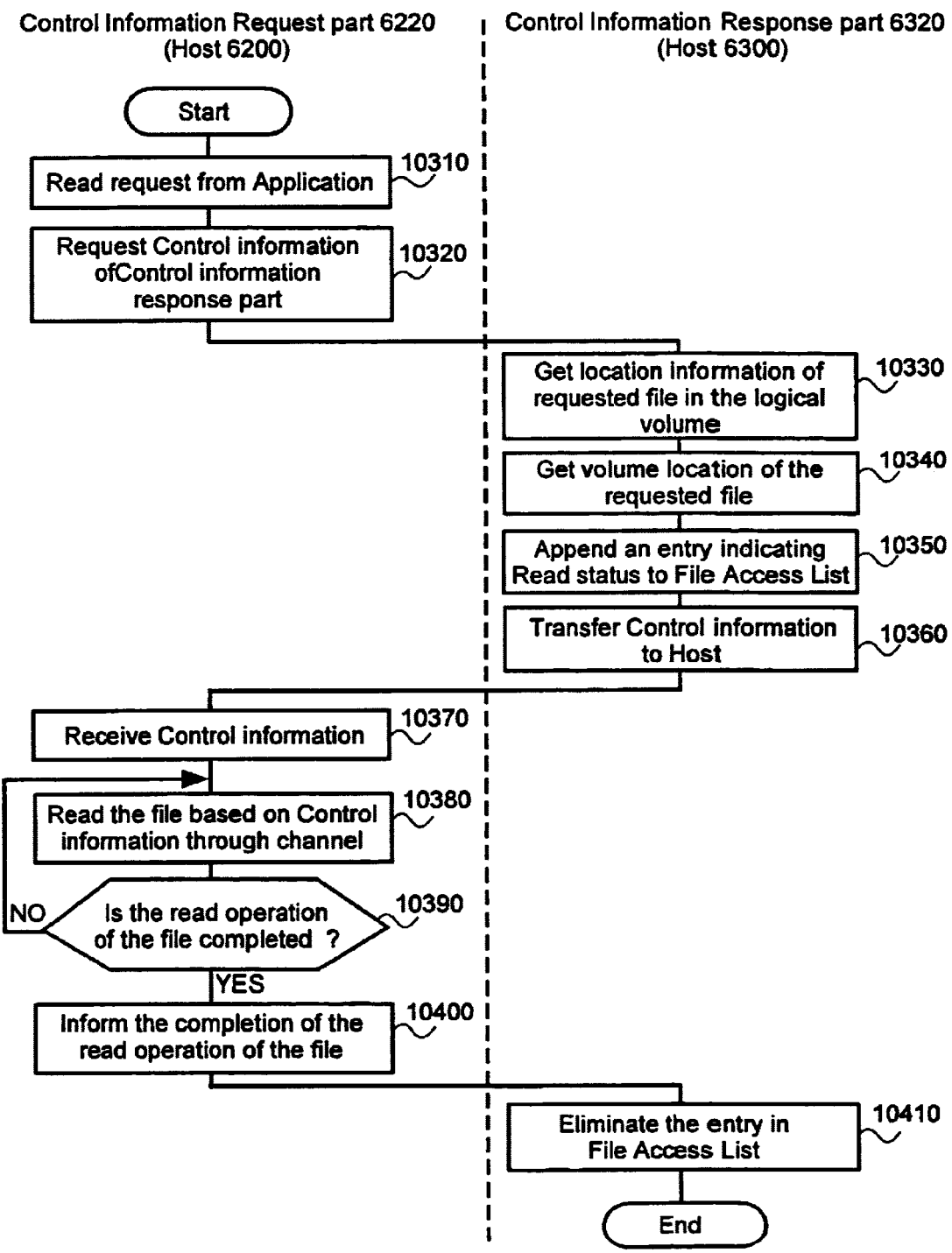
FIG. 13 illustrates a flowchart of a representative operation performed when the application program 6240 of Host 6200 reads out a file stored in the disk subsystem in a particular embodiment according to the present invention.

FIG. 13 illustrates a flowchart of a representative operation performed when the application program reads data out of a file stored in the disk subsystem in a particular embodiment according to the present invention. FIG. 13 illustrates a flowchart of the operation to be performed when the application program 6240 in the Host 6200 reads data out of a file stored in the disk subsystem.

The control information request part 6220 receives a read request issued by the application program 6240 to read out the data stored in be disk subsystem 6400 (Step 10310). The control information request part 6220 requests the control information for the file read operation of the control information response part 6320 in the Host 6300 based on the read request (Step 10320).

The control information response part 6320 obtains the file management information of the file from OS 6350 as the response to the request from the Host 6200 (Step 10330). Next, the control information response part 6320 obtains the information regarding the location of the logical volume where the file requested for reading is located from the storage manager 6360 (Step 10340).

The control information response part 6320 also checks if the read request is possible to execute by referring to the file access list 6370. If it is possible, the information indicating that the requested file is in Read status for the Host 6200 is appended to the file access list 6370 (Step 10350). After these operations, the control information response part 6320 transfers the control information which includes information such as file management information and volume location of the control information request part 6220 in the Host 6200 (Step 10360).

The control information request part 6220 in the Host 6200 reads data out of the file from the disk subsystem 6400 based on the obtained control information when it receives the control information returned from the control information response part 6320 in the Host 6300 (Step 10370). The data read out is transferred to the application program 6240 in order (Step 10380). The control information request part 6220 checks if the file read operation is finished. If not finished, it continues the read operation of the file in Step 10380 (Step 10390). The control information request part 6220 informs the control information response part 6320 in the Host 6300 when the file read operation is finished (Step 10400).

The control information response part 6320 in the Host 6300 eliminates the information, regarding the read request of the file, which was appended to the file access list 6370 in Step 10350 (Step 10410). According to the procedures described above, the read operation from the Host 6200 is completed.

Figure 14:
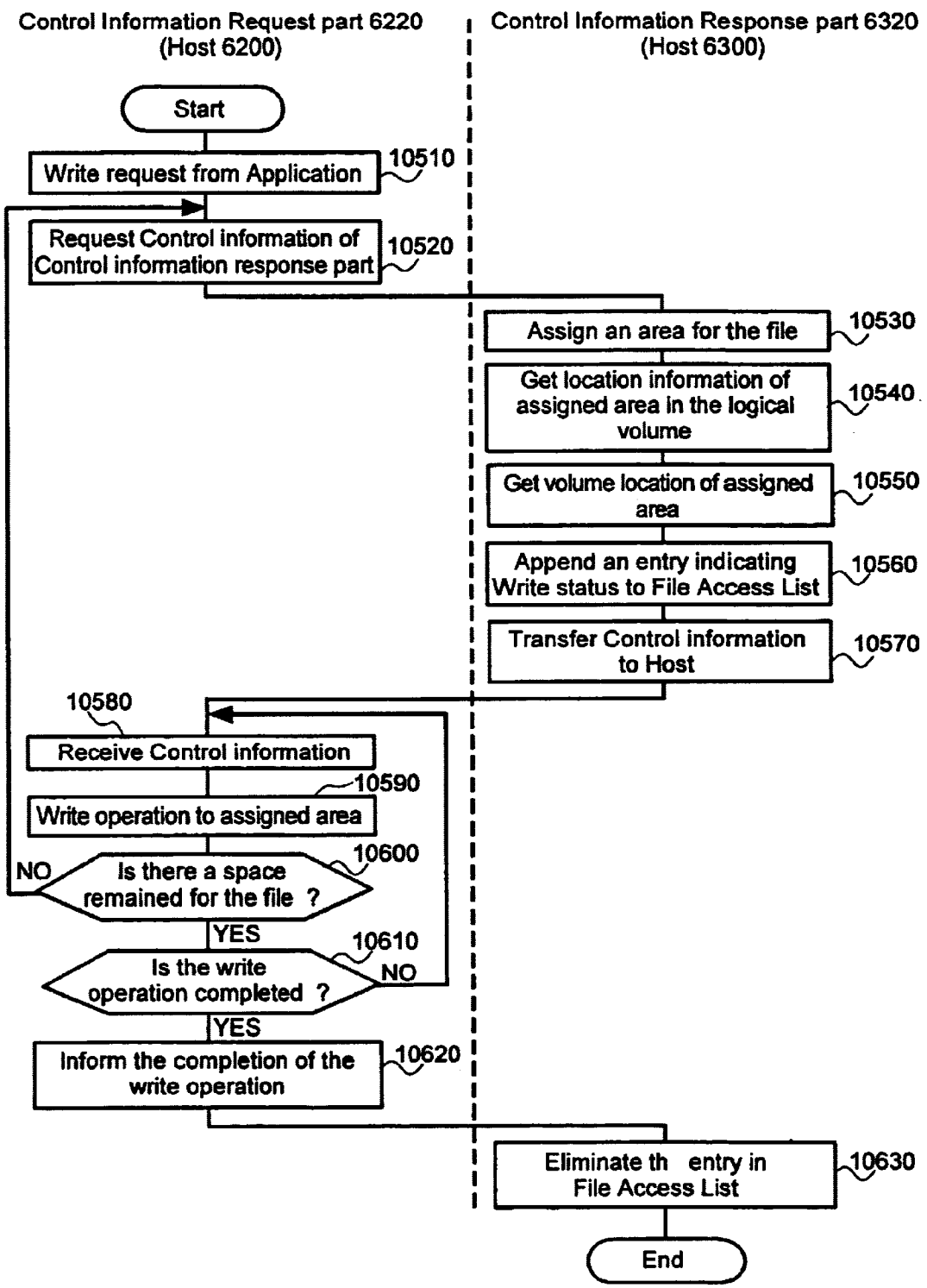
FIG. 14 illustrates a flowchart of a representative write operation for a file into the disk subsystem by an application program 6240 of Host 6200 in a particular embodiment according to the present invention.

FIG. 14 illustrates a flowchart of a representative write operation for a file into the disk subsystem by an application program in a particular embodiment according to the present invention. FIG. 14 illustrates a flowchart for a write operation of a file into the disk subsystem 6400 by the application program 6240 in the Host 6200.

The control information request part 6220 in the Host 6200 receives a write request issued by the application program 6240 to write the file data into the disk subsystem 6400 (Step 10510). The control information request part 6220 requests the information, necessary to write the file, from the control information response part 6320 in the Host 6300 based on the received write request (Step 10520).

The control information response part 6320 assigns an area on the disk unit 6410 in the disk subsystem 6400 where the file is to be written, responsive to the request from the control information request part 6220. The area is given a temporary file name (e.g., "temp") in case of the first assignment (Step 10530). Next, the control information response part 6320, obtains the file management information regarding the assigned area in Step 10530 from OS 6350 (Step 10540), and obtains the information from the storage manager 6360 regarding the location of the logical volume which contains the assigned area (Step 10550).

Then, the control information response part 6320 checks if it is possible to execute the write request by referring to the file access list 6370. If it is possible, the information indicating that the requested file is in write status by the Host 6200 is appended to the file access list 6370 (Step 10560). After these operations, the control information response part 6320 transfers the control information which includes information such as file management information and volume location to the control information request part 6220 in the Host 6200 (Step 10570).

The control information request part 6220 in the Host 6200 obtains the control information returned by the control information response part 6320 (Step 10580), and starts writing the file data based on this control information (Step 10590). The control information request part 6220 checks if the write operation has been finished during the write operation of the file data properly (Step 10600). If not finished, the control information request part 6220 checks the size of the area assigned in Step 10530, and checks if there is a space remaining for the write area of the file data. If there is no space remaining, the control information request part 6220 returns to Step 10520 to assign an area again. On the other hand, if there is a space remaining, the control information request part 6220 returns to Step 10590 to continue writing the file data (Step 10610).

If all of the file data have been written completely in Step 10600, the control information response part 6320 in the Host 6300 is informed of the completion of the write operation (Step 10620).

Control information response part 6320 eliminates the information appended to the file access list 6370 in Step 10560 upon being informed of the completion of the write operation. Then, the temporary name is renamed to the name given by the Host 6200 (Step 10630). According to the operations described herein above, the write operation of the file by the Host 6200 is completed.

Figure 15:
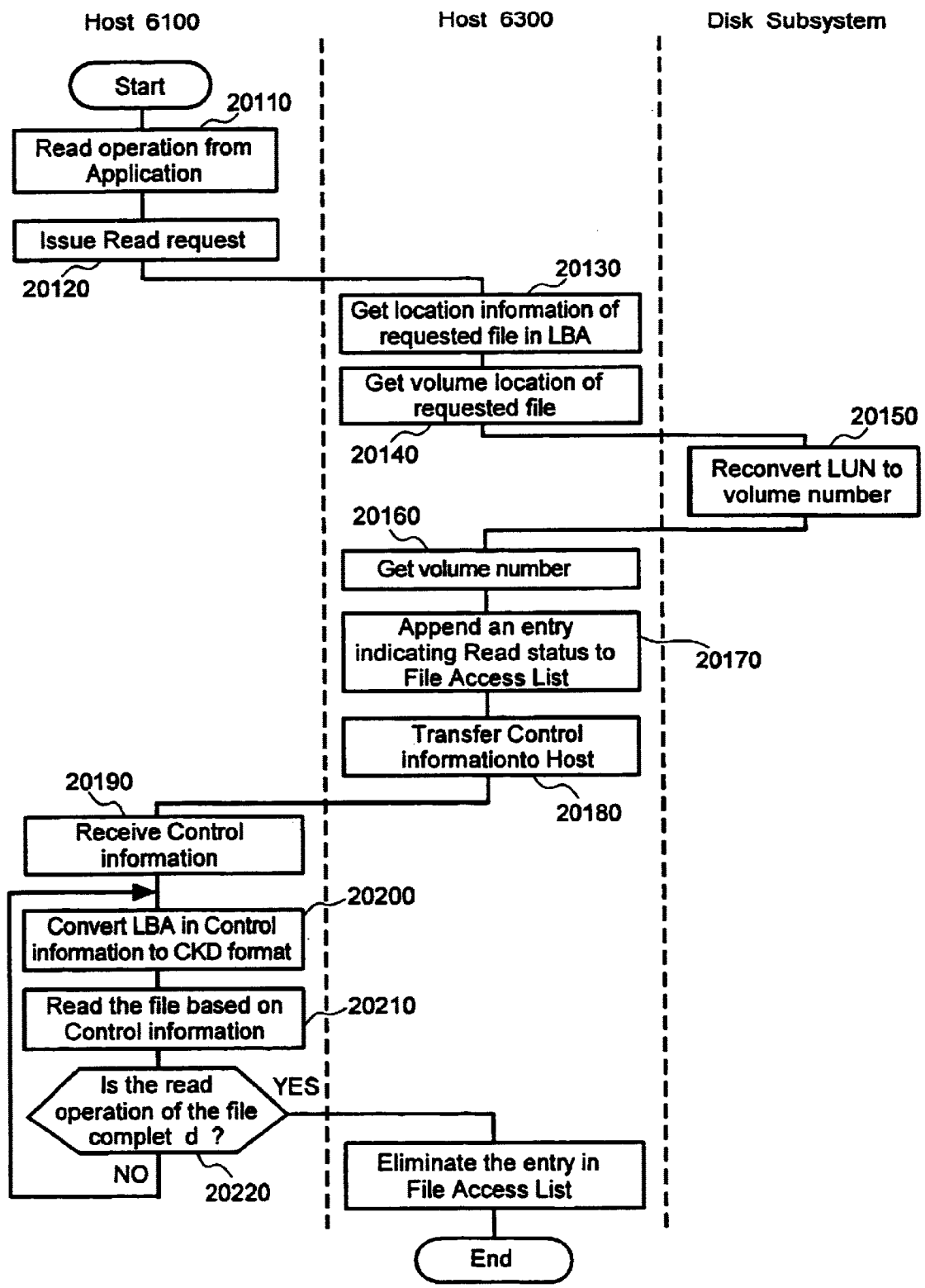
FIG. 15 illustrates a flowchart of a representative read operation for a file by the application program 6100 in a particular embodiment according to the present invention.

FIG. 15 illustrates a flowchart of a representative read operation for a file by the application program in a particular embodiment according to the present invention. FIG. 15 illustrates a flowchart for a read operation of a file by the application program 6140 in the Host 6100.

The control information request part 6120 in the Host 6100 receives a read request issued by the application program 6140 to read out data (Step 20110). The control information request part 6120 requests the control information necessary for the file read operation to the control information response part 6320 in the Host 6300 based on the read request issued by the application program 6140 (Step 20120).

The control information response part 6320 obtains the file management information from OS 6350 for the requested file responsive to the request from the Host 6100, and gets the LBA of the file stored (Step 20130). Then, the control information response part 6320 requests the information regarding the volume location storing the requested file to the storage manager 6360 (Step 20140). The storage manager 6360 obtains LDEV number in the disk subsystem 6400 from LUN of the logical volume storing the file by using the process described in FIG. 12 (Step 20150) and transfers it to the control information response part 6320 (Step 20160).

Control information response part 6320 checks if it is possible to execute the read request by referring to the file access list 6370. If possible, the information indicating that the file requested is in read status with the Host 6100 is appended to the file access list 6370 (Step 20170). Then, the control information response part 6320 transfers the control information containing the file management information and LDEV number to the control information request part 6120 (Step 20180).

The control information request part 6120 obtains the control information returned by the control information response part 6320 (Step 20190), and converts an LBA obtained from the management information contained in the received control information into a CKD format address (Step 20200). The control information request part 6120 reads a file from the disk subsystem 6400 based on the converted address and other control information. At this time, the Host 6100 accesses the data in the disk subsystem 6400 through the interface in accordance with CKD format (Step 20210). The control information request part 6120 checks properly if the read operation has been finished. If not finished, it repeats the operation of Steps 20220 and 20210. On the other hand, if completed, it informs the completion to the control information response part 6320 in the Host 6300 (Step 20220).

The control information response part 6320, upon the report of the completion of the read operation, eliminates the information appended to the file access list 6370 in step 20170 and terminates the read operation (Step 20230).

Figure 16:
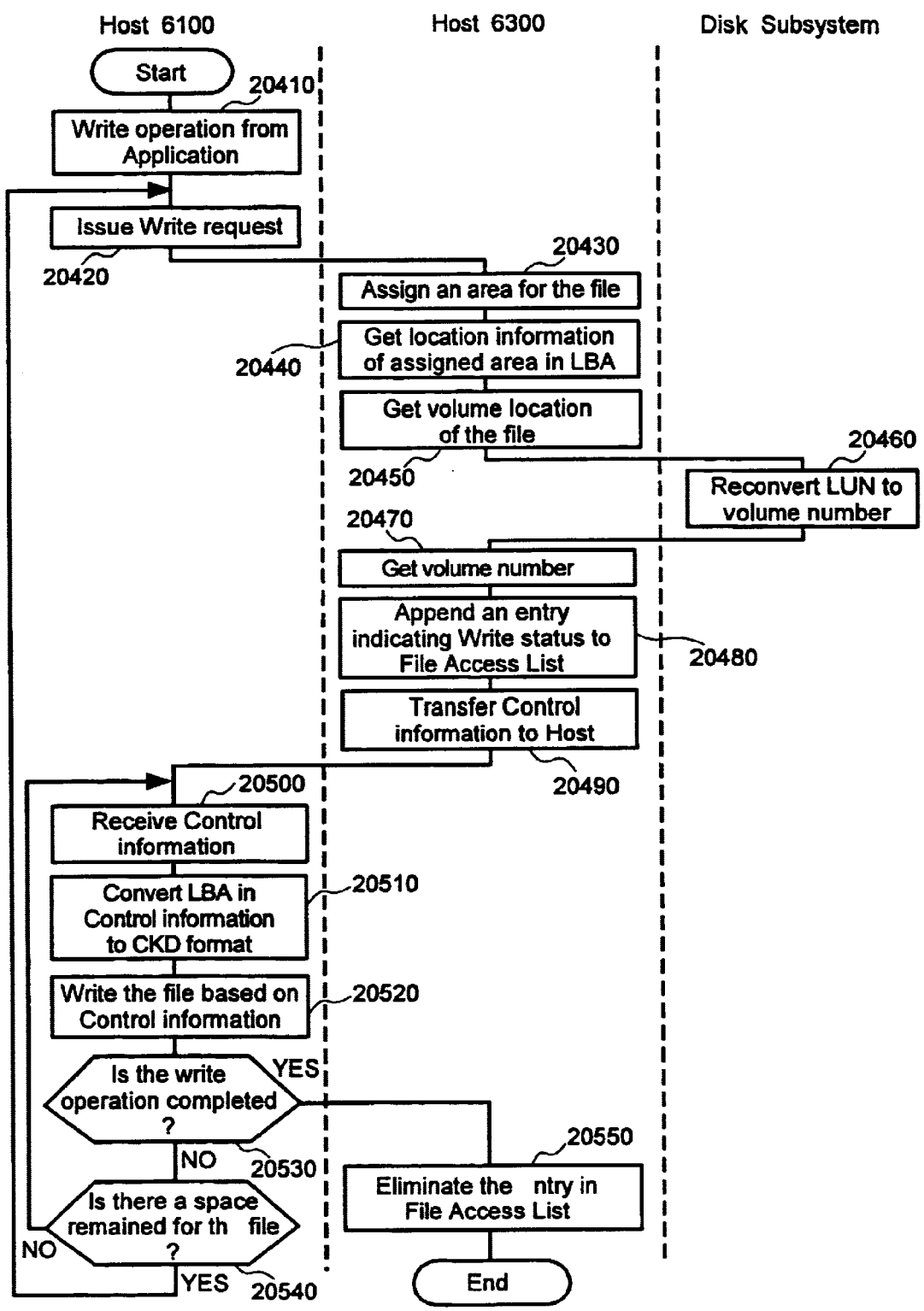
FIG. 16 illustrates a flowchart of a representative write operation for a file into a disk subsystem 6400 by an application program 6140 of Host 6100 in a particular embodiment according to the present invention.

FIG. 16 illustrates a flowchart of a representative write operation for a file into a disk subsystem by an application program in a particular embodiment according to the present invention. FIG. 16 illustrates a flowchart for the write operation of a file into the disk subsystem 6400 by the application program 6140 in the Host 6100.

The control information request part 6120 in the Host 6100 receives the write request issued by the application program 6140 in order to write a file (Step 20410). The control information request part 6120 requests the information necessary for writing the file, of the control information response part 6320 in the Host 6300 based on the write request issued by the application-program 6140 (Step 20420).

The control information response part 6320 assigns an area for writing a file on the disk unit 6410 in the disk subsystem 6400 according to the request from the control information request part 6220, and gives a temporary name to the area (Step 20430). Hereafter, the control information response part 6320 obtains the file management information from the OS and an LBA of the assigned area in the same manner as a read operation (Step 20440). Then, the control information response part 6320 requests the information regarding the location of the volume containing the assigned area of the storage manager 6360 (Step 20450). The storage manager 6360 obtains LDEV number in the disk subsystem 6400 from LUN of the logical volume storing the file in the disk subsystem 6400 (Step 20460), and transfers it to the control information response part 6320 (Step 20470).

The control information response part 6320 checks if it is possible to execute the write request by referring to the file access list 6370. If it is possible, the information indicating that the requested file is in write status with the Host 6100 is appended to the file access list 6370 (Step 20480). After these operations, the control information response part 6320 transfers the control information, which includes information such as file management information and LDEV number, to the control information request part 6120 in the Host 6100 (Step 20490).

The control information request part 6120 obtains the control information returned by the control information response part 6320, and converts the LBA, which is obtained from the management information contained in the received control information, to a CKD format address (Step 20510). The control information request part 6120 performs the write operation of the file into the disk subsystem 6400 based on the converted address and other control information (Step 20520).

The control information request part 6120 checks if the write operation has been finished properly (Step 20530). If not finished, the control information request part 6120 checks if there is an unused space in the file area assigned. Then, control information request part 6120 repeats the operations of step 20420 and following if there is no space remaining. Otherwise, control returns to step 20510 to continue the write operation if there is a space remaining (Step 50540).

If the write operation is judged as completed in step 20530, the control information request part 6120 informs the completion of the write operation to the control information response part 6320 in the Host 6300. The control information response part 6320 eliminates the information appended to the file access list 6370 in step 20480 upon the completion report. According to the operations described above, the write operation is completed (Step 20550).

In specific embodiments, such as the embodiments described above with reference to FIG. 8 and following, it is also possible to share the files in the disk subsystem connected to more than one host, between a host accessing to the disk in accordance with CKD format and a host accessing to the disk in accordance with FBA format.

Specific embodiments described above can provide for a host computer to access one or more blocks of the data, stored in a storage apparatus in Fixed-block length format, by using I/O interface of CKD format with a single command. Particularly, the resources of a host, a disk subsystem and transferring path are utilized effectively since it is possible to access in units of blocks and redundant data transfers of data are reduced or eliminated.

Furthermore, it is possible to access a relatively large data of a plurality of blocks with a single command, so that the operational overhead of the command issuance by a host and at the command processing in a disk subsystem can be eliminated.

CONCLUSION

Although the above has generally described the present invention according to specific systems, the present invention has a much broader range of applicability. The specific embodiments described herein are intended to be merely illustrative and not limiting of the many embodiments, variations, modifications, and alternatives achievable by one of ordinary skill in the art. Further, the diagrams used herein are merely illustrations and should not limit the scope of the claims herein. One of ordinary skill in the art would recognize other variations, modifications, and alternatives. Thus, it is intended that the foregoing description be given the broadest possible construction and be limited only by the following claims.

The preceding has been a description of the preferred embodiment of the invention. It will be appreciated that deviations and modifications can be made without departing from the scope of the invention, which is defined by the appended claims.

What is claimed is:

1. An access method for use with a storage apparatus of a computer system, said computer system comprising a computer having an interface in accordance with a variable length data format, and a storage apparatus which stores data recorded on a recording media in accordance with fixed block length format; wherein said storage apparatus is connected with said computer by the interface in accordance with variable length data format, said method comprising:

generating parameters at said computer, said parameters for transferring the data recorded on said recording media, and an access command which includes information indicating that the access is to data in fixed block length format, said access command being in accordance with variable length data format;

transferring said access command from said computer to said storage apparatus through the interface in accordance with said variable length data format;

analyzing at said storage apparatus the received access command; and accessing data recorded in accordance with said fixed block length format based on said parameters if said received access command contains the information indicating that said access command is for the data recorded in accordance with said fixed block length format.

2. An access method for use with a storage apparatus according to claim 1, characterized in that:

said information, indicating that said access command is to the data in accordance with said fixed block length format, is realized as a command which is different from a command to access the data in accordance with variable length data format.

3. An access method for use with a storage apparatus according to claim 1, characterized in that:

said information indicating that said access command is to the data in accordance with said fixed block length format is included in said access command as a part of said parameters.

4. An access method for use with a storage apparatus according to claim 1, characterized in that:

the data transfer between said computer and said storage apparatus, accompanied by the access to the data recorded in accordance with said fixed block length format, is performed block by block.

5. A storage apparatus comprising:

a first interface in accordance with variable length data format;

a second interface in accordance with fixed block length format;

a storage unit that stores data used by a computer connected by either of said first or second interface;

a command analyzing means which is used to analyze a command transferred by first computer through said first interface, and comprises the means to distinguish if a command transferred by said first computer is to the data stored in said storage unit in accordance with fixed block length format or not; and transfer means of data between said first computer and said storage apparatus through a protocol in accordance with said first interface, which data is the data recorded in accordance with fixed block length format to be read out from said storage unit or to be written to said storage unit when the command is transferred from said first computer is defined by said analyzing means as a command to the data recorded in accordance with fixed block length format.

6. A storage apparatus according to claim 5, comprising:

said analyzing means to distinguish said condition based on a predetermined parameter included in a command transferred from said first computer.

7. A storage apparatus according to claim 5, comprising:

said analyzing means to distinguish said condition by discriminating that a command transferred from said first computer is a predetermined command corresponding to data in accordance with fixed block length format.

8. A storage apparatus according to claim 5, comprising:

said transfer means to transfer data between said first computer and said storage apparatus every block by block in accordance with said fixed block length format.

9. A computer system comprising a first computer having a first interface in accordance with variable length data format, and a storage apparatus operable with the first interface in accordance with variable length data format, said storage apparatus prepared with a second interface in accordance with fixed block length format, in which the storage apparatus is connected to the first computer by the first interface; wherein:

said first computer comprises a generating means for parameters for transferring data recorded on a recording media of said storage apparatus in accordance with fixed block length format, and generating means of a command in accordance with variable length data format, containing the information indicating that the access is to data in accordance with fixed block length format;

said storage apparatus comprising command analyzing means for analyzing a command transferred by the first computer through said first interface, the command analyzing means further comprises a means to distinguish if a command transferred by said first computer is to the data stored in accordance with fixed block length format or not; and said storage apparatus comprising transfer means of data between said first computer and said storage apparatus through a protocol in accordance with said first interface, which data is the data recorded in accordance with fixed block length format or the data to be stored in fixed block length format when the command transferred from said first computer is defined by said analyzing means as a command to the data recorded in accordance with fixed block length format.

10. A computer system according to claim 9, comprising:

a second computer which is prepared with an interface in accordance with fixed block length format and connects said storage apparatus through said second interface, and wherein data, which data is recorded in said storage apparatus in accordance with said fixed block length format, is shared between said first computer and said second computer.

11. An access method for use with a storage apparatus of a computer system, said computer system comprising a computer having a variable length data format interface, and a storage apparatus which stores data on a recording media in a fixed block length format; wherein said storage apparatus is connected with said computer by the variable length data form interface, said method comprising:

generating at said computer, parameters for transferring data recorded on said recording media, and an access command which includes information indicating that data in fixed block length format is to be accessed, said access command being in accordance with variable length data format;

transferring said access command from said computer to said storage apparatus through the variable length data format interface;

analyzing at said storage apparatus, the access command received from said computer; and accessing data recorded in fixed block length format based on said parameters if said access command received from said computer contains the information indicating that said access command is for the data recorded in fixed block length format.

12. An access method for use with a storage apparatus according to claim 11, wherein:

said information indicating that said access command is directed to fixed block length format data, is realized as a command which is different from a command to access the data in accordance with variable length data format.

13. An access method for use with a storage apparatus according to claim 11, wherein:

said information indicating whether said access command is for data recorded in fixed block length format is included in said access command as a part of said parameters.

14. An access method for use with a storage apparatus according to claim 11, wherein:

transferring said access command from said computer to said storage apparatus through the variable length data format interface, is performed block by block.

15. A storage apparatus comprising:

a first interface in accordance with variable length data format;

a second interface in accordance with fixed block length format;

a storage unit that stores data used by a computer connected by either of said first or second interface;

a command analyzer for analyzing a command transferred by a first computer through said first interface, whereupon, said command analyzer distinguishes if a command transferred by said first computer is directed to data stored in said storage unit in accordance with fixed block length format or not; and a data transfer module for transferring data between said first computer and said storage apparatus using a protocol in accordance with said first interface; wherein the data is read out from said storage unit or is written into said storage unit in fixed block length format, provided that when the command is transferred from said first computer, it is determined by said command analyzer to be a command to access data recorded in fixed block length format.

16. An apparatus according to claim 15, wherein said command analyzer determines said command to be a command to access data in fixed block length format based on a predetermined parameter included in said command transferred from said first computer.

17. An apparatus according to claim 15, wherein said command analyzer determines that said command transferred from said first computer is a predetermined command corresponding to data in fixed block length format.

18. An apparatus according to claim 15, wherein said transfer module transfers fixed block length format data between said first computer and said storage apparatus block by block.

19. A computer system comprising:

a first computer having a first interface for exchanging data in a variable length data format, a second interface for exchanging data in a fixed block length format, and a storage apparatus connected to the first computer by the first interface, said storage apparatus capable of exchanging data with said first computer via said first interface according to a variable length data format; wherein:

said first computer further comprises a parameter generator that generates parameters for transferring data recorded on a recording media of said storage apparatus according to a fixed block length format, and a command generator for generating a command according to a variable length data format, wherein the command contains information indicating that data is to be accessed in fixed block length format;

said storage apparatus comprising a command analyzer for analyzing a command transferred by the first computer through said first interface, the command analyzer being operative to distinguish if a command transferred by said first computer is to the data stored in accordance with fixed block length format or not; and said storage apparatus further comprises a transfer module for transferring data between said first computer and said storage apparatus according to a protocol of said first interface, which data is recorded or stored in a fixed block length format when the command transferred from the first computer is determined by the command analyzer to be a command in which the data is recorded or stored in fixed block length format.

20. A computer system according to claim 19, further comprising a second computer having a fixed block length format interface that connects said storage apparatus through said second interface, and wherein said first computer and said second computer share data, which data is recorded in said storage apparatus in said fixed block length format.

* * * * *